Feb. 8, 1955 H. B. VAN DORN 2,701,732
REMOVABLE BEARING SHIELD OR SEAL
Filed July 23, 1949 3 Sheets-Sheet 1

INVENTOR.
HORACE B. VAN DORN
BY
ATTORNEYS

Feb. 8, 1955    H. B. VAN DORN    2,701,732
REMOVABLE BEARING SHIELD OR SEAL
Filed July 23, 1949    3 Sheets-Sheet 2
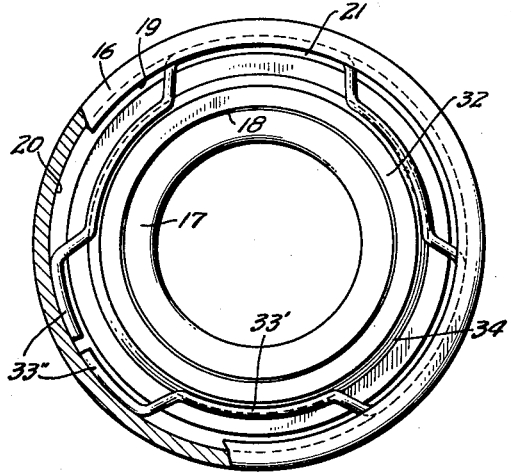
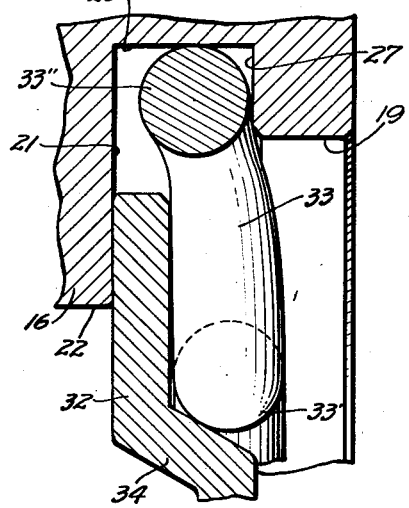
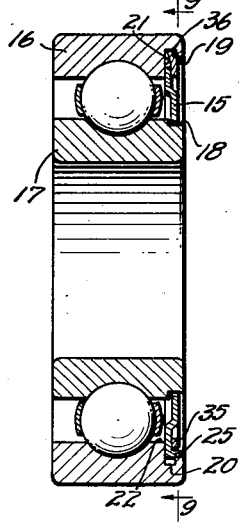
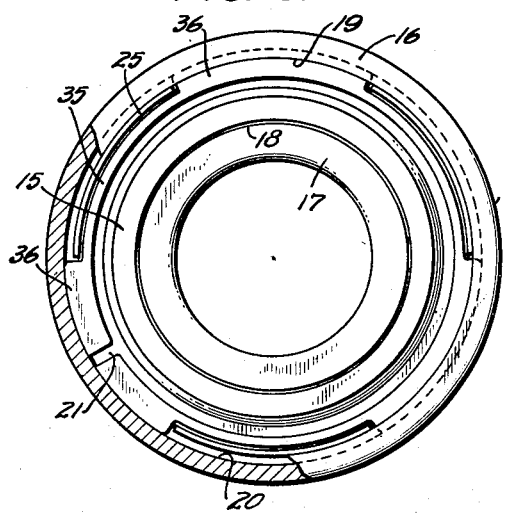
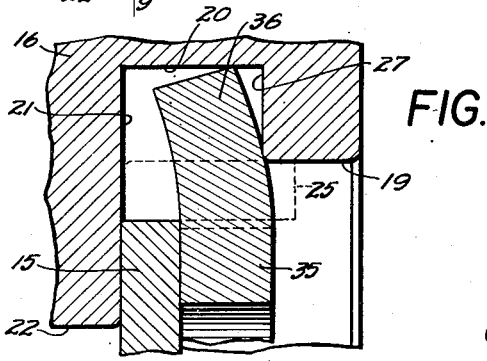
INVENTOR.
HORACE B. VAN DORN
BY
ATTORNEYS INVENTOR.
HORACE B. VAN DORN
BY
*Mitchell Bechert*
ATTORNEYS

United States Patent Office 2,701,732
Patented Feb. 8, 1955

2,701,732

REMOVABLE BEARING SHIELD OR SEAL

Horace B. Van Dorn, New Britain, Conn., assignor to The Fafnir Bearing Company, New Britain, Conn., a corporation of Connecticut Application July 23, 1949, Serial No. 106,405

5 Claims. (Cl. 286—5)

My invention relates to a removable seal or shield or the like means for a bearing.

It is an object to provide improved means of the character indicated.

It is another object to provide an improved removable shield or seal or the like means wherein the removable parts may be unimpaired upon removal, and wherein a shield or seal of the same effectiveness may be established upon reassembly, no matter how often the parts may be removed, as for inspection or servicing of the bearing.

It is another object to provide a self-piloting removable shield or seal means for a bearing.

It is a further object to provide a removable preloaded shield or seal means for a bearing, whereby the parts may be inherently resiliently retained in place and may not tend to rattle or become displaced in use.

It is a general object to provide means of the character indicated which may be simple to remove and install, which may be cheap to manufacture in large quantities, which may not impose severe tolerance limitations on the construction of any parts, and which may be applied to standard bearing-ring constructions without requiring specially formed rings.

Other objects and various further features of the invention will be pointed out or will occur to those skilled in the art from a reading of the following specification in conjunction with the accompanying drawings. In said drawings, which show, for illustrative purposes only, preferred forms of the invention:

Fig. 6 is an end view, partly in section, of a bearing to which alternative removable shield means is applied;

Fig. 7 is an enlarged fragmentary sectional view illustrating cooperation of parts in the arrangement of Fig. 6;

Fig. 8 is a vertical sectional view of a modified removable plate shield for a bearing;

Fig. 9 is an end view of the arrangement of Fig. 8, shown partly in section more or less in the plane 9—9 of Fig. 8;

Fig. 10 is an enlarged fragmentary sectional view illustrating cooperation of parts in the arrangement of Fig. 8;

Figure 1:
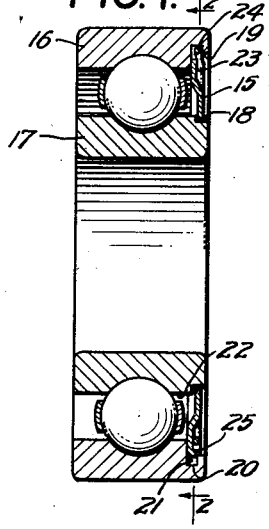
Fig. 1 is a vertical sectional view of an antifriction bearing with a removable plate shield incorporating features of the invention.
Figure 2:
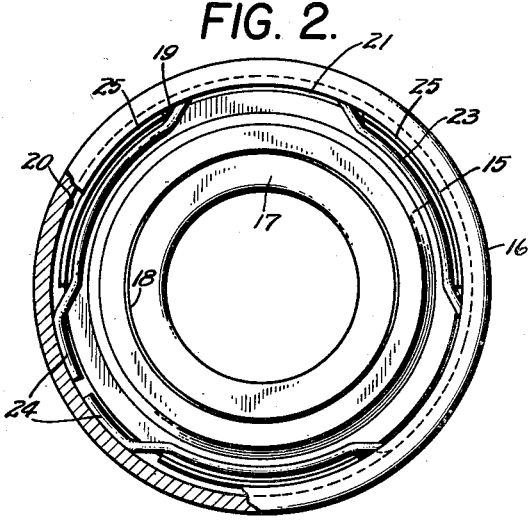
Fig. 2 is a side elevation, partly in section, in the plane 2—2 of Fig. 1.

Briefly stated, my invention contemplates a removable shield or seal or the like means for a bearing and utilizing essentially two parts to be carried by one of the two relatively rotatable bearing members. One of the parts is preferably relatively non-deformable and is to be held against an abutment on the one bearing member, while the other part is preferably resiliently deformable to hold the relatively non-deformable part against the abutment while resiliently engaging a retaining groove in said one bearing member. In application to one of the rings of an antifriction bearing, the said ring may be rabbeted at one end, and a groove may be provided adjacent the rabbeted portion, whereby an axial locating abutment for the shield disc may be defined by the wall of the groove opposite the rabbeted portion; alternatively, the rabbeted portion may itself be grooved, so that the inner wall of the rabbeted portion may serve as the abutment; in each case, a retaining member, such as a snap ring, may engage the groove. Various self-piloting or self-centering disc constructions are shown and described for utilizing the grooved and rabbeted-ring constructions indicated generally above.

Referring to Figs. 1 through 4 of the drawings, I have shown an application of the principles of my invention in connection with a plate-shield or the like disc member 15 to be removably carried by the outer ring 16 of an antifriction bearing and to extend across the annular space between the outer ring 16 and the inner ring 17, in clearance relation with a rabbeted portion 18 on the inner ring. As indicated generally above, the ring which carries the shield disc 15 may be rabbeted, as at 19, at an end of the ring (16) to be shielded, and a groove 20 may be formed adjacent to or in the rabbeted portion 19. There may thus be defined a generally radially extending annular abutment surface 21 effectively determined by the diameter of the rabbeted portion 19 and the diameter of the ring surface 22 from which the rabbet 19 and groove 20 are cut.

In the present disclosure, the term "rabbet" is employed in the board sense, as at either of the cut-away portions 18—19 of the inner and outer rings 17—16, respectively. In the outer ring 16, the portion 19 may be a counterbore, but for purposes of the present description it will be understood to be, broadly, a rabbeted portion.

The removable-shield means may be of two parts, of which the plate member 15 may be relatively non-deformable, and of which a snap ring 23 may be resiliently deformed. Snap ring 23 is shown formed of wire, with a plurality of angularly spaced lobes or projections 24 to extend into the retaining groove 20. In the form shown, the shield member 15 is formed with a plurality of angularly spaced piloting members or lips 25 projecting axially for riding engagement with the rabbeted portion 19. The thickness of the plate-shield member 15 is preferably such that sufficient snap-ring access may be had to the groove 20 after the plate member 15 has been abutted against the inner wall 26 of the groove 20. When the shield member 15 has been so applied to the bearing assembly, the projection or lobe 24 at one end of the snap wire 23 may first be fed into one access opening to the groove 20, and then the next lobe 24 may be fed into the next access opening for the groove 20, and so on, until the entire snap wire 23 has been fed into all access openings between the piloting lips 25.

Figure 3:
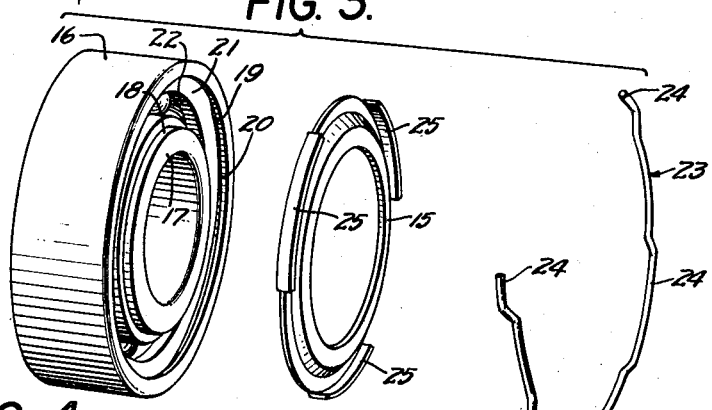
Fig. 3 is an exploded perspective view of parts of the construction of Fig. 1 prior to assembly of the removable parts.
Figure 4:
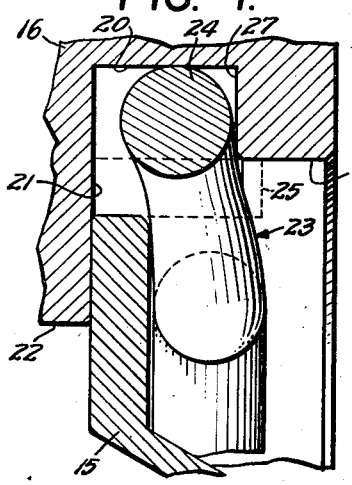
Figure 4 is an enlarged fragmentary sectional view illustrating cooperation of parts in the structure of Fig. 1.

In its natural or relaxed state, the snap wire 23 is preferably relatively wide open as shown in Fig. 3, so that, as the various remaining lobes 24 are inserted into the groove 20, the snap wire 23 will be radially compressed. It will then be understood that by virture of its resilient properties, the snap wire 23 may retain itself and therefore the plate 15 assembled to the bearing. When it is desired to remove the shield member 15, a simple insertion of a penknife or other instrument under a part of the wire 23 may remove one end thereof so that the remainder of the snap wire 23 may be quickly removed without deforming any part thereof.

The snap wire 23 may be of various shapes in order effectively to preload the shield plate 15 against the inner or abutment wall 21. In the form shown, desired preloading may be achieved by forming the snap wire (in its relaxed state) in substantially a single radial plane. When applied to the bearing, as shown in greatly enlarged detail in Fig. 4, and if the combined effective axial thickness of the plate member 15 and of the wire 23 exceed the axial distance between the abutment wall 21 and the wire-retaining wall 27, then it will be clear that, in the process of applying the snap ring 23, said ring 23 will not only be radially compressed but axially distended, thus effectively applying an anti-rattling preload to the plate member 15.

Figure 5:
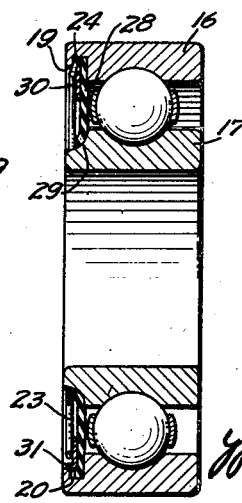
Fig. 5 illustrates an application of the principles of the Fig. 1 construction to the removable retention of a seal for a bearing.

The plate-retaining means which has been described may be employed with equal effectiveness in the removable retention of a seal means for a bearing, and in Fig. 5 I illustrate such application. In the construction of Fig. 5, the seal means comprises essentially a single annular washer 28 of flexible rubber-like material to be seated in the groove 20 and to extend into light wiping but sealing contact with a generally arcuately directed rabbet portion 29 in the inner bearing ring 17, in the manner more fully disclosed in patent to Harry R. Reynolds et al., No. 2,281,010, patented April 28, 1942. The rubber-like disc 28 may be compressed against the axially inner wall of the groove 20 by means of a relatively non-deformable plate or disc member 30 having lips 31 to be located on the rabbeted portion 19 of the outer bearing ring 16. Again, a snap wire 23 may engage the groove 20 and axially compress or preload the disc 30 against the seal member 28. It will be clear that removal of the seal means of Fig. 5 may be just as readily accomplished as removal of the shield of Figs. 1 to 4, as by insertion of an ice-pick or penknife, and that all the seal parts, including the rubber-like shield member 28, may be removed and replaced without impairing the sealing effectiveness.

In Figs. 6 and 7, I show an alternative construction wherein a plate-shield member 32 may be self-piloting with the assistance of a suitably formed snap wire 33. The plate 32 need only radially overlap parts of the inner wall 21 of the groove 20, and no piloting flanges or lips (as at 25 in the previously described constructions) need be employed. In Figs. 6 and 7, piloting support may be derived from a generally axially extending portion 34, which may be formed out of the main radial body of the shield member 32. I prefer that the axially projecting portion 34 shall be generally conical, as shown, and that the lobes of the snap wire 33 shall be of such radial extent that the inner lobes 33' may axially resiliently engage the conical portion 34, while the outer lobes 33'' radially outwardly resiliently engage the bottom of the groove 20. Again, if the combined thickness of the wire 33 and of the plate member 34 are selected to exceed the effective axial distance from the wire-retaining groove wall 27 to the inner wall 21, then the wire 23 may axially preload the plate 32, as will be clear.

In Figs. 8, 9, and 10, I show a modification of the previously described arrangements, wherein a substantially flat removable snap-ring member 35 may serve in place of the snap wires which have been discussed thus far. The ring 35 is again preferably of resilient material, and in a normal unstressed state the ring 35 may be relatively open so that when fitted into the groove 20 and against a plate shield, like the shield 15 of Fig. 1, the ring 35 will hold itself in place. As in the case of the wire snap rings, the flat snap ring 35 may be formed with a number of lobes or projections 36 to straddle the piloting lips 25 of the disc 15 and to engage the groove 20. By reference to Fig. 10, it will be seen that if the combined thickness of the ring 35 and of the plate-shield member 15 exceed the effective axial distance between the abutment walls 21—27, then the snap ring 35 may effectively axially preload the shield member 15.

Figure 11:
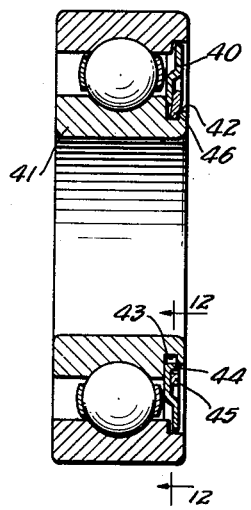
Fig. 11 is a vertical sectional view of an antifriction bearing to which removable slinger means has been applied.
Figure 12:
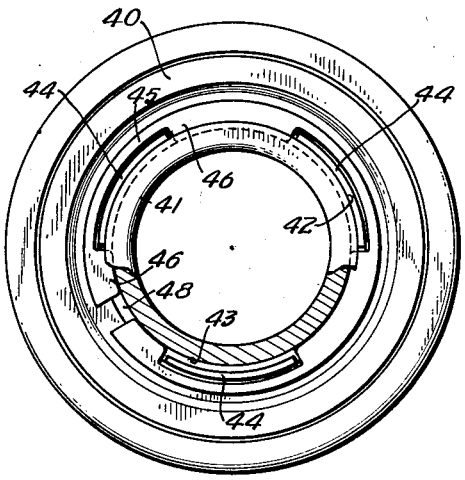
Fig. 12 is an end view of the arrangement of Fig. 11, shown partly in section more or less in the plane 12—12 of Fig. 11.
Figure 13:
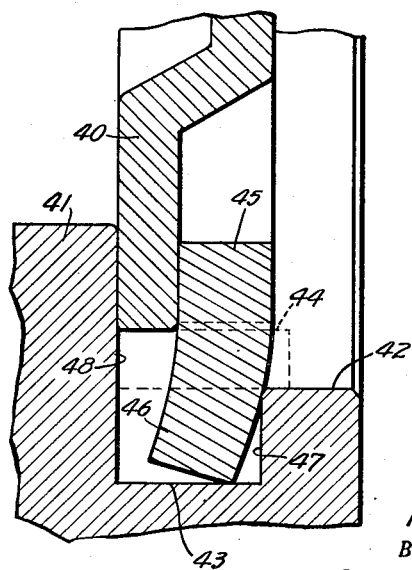
Fig. 13 is an enlarged fragmentary sectional view illustrating cooperation of parts of the arrangement of Fig. 11.

In Figs. 11, 12, and 13, I show an application of the principles of the construcititons of Figs. 8, 9, and 10 to the removable retention of a slinger or shield member 40 piloted on and carried by the inner bearing ring 41 of an antifriction bearing. The inner ring 41 may be rabbeted, as at 42, at one end thereof, and a groove 43 may be formed in or adjacent to the rabbeted portion 42. The slinger member 40 may be formed with axially projecting means 44 for self-piloting or locating contact with the rabbeted portion 42, as shown more clearly in Fig. 13. A resilient snap ring 45 may include inwardly directed lobes or projections 46 for engagement with the groove 43, and the lobes 46 may span the piloting lips 44. I prefer that the snap ring 45 shall be self-retaining and, therefore, that in an unstressed state the inner dimensions of the snap ring 45 shall be less than the inner dimensions of the groove 43. As in the case of another discussed construction, by selecting a combined effective thickness of the plate member 40 and of the snap-ring member 45 exceeding the distance between the outer wall 47 of the groove 43 and the inner or abutment wall 48, the inserted snap ring 45 may be resiliently deformed in such a way as to provide an axial preload on the slinger plate 40.

Figure 14:
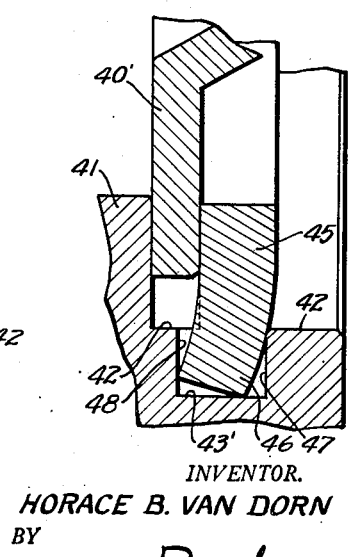
Fig. 14 is a view similar to Fig. 13, showing a modified construction.

In Fig. 14, I show a modification of the construction of Fig. 13 wherein the groove 43 is formed in the rabbeted portion 32 so that the inner part of the rabbeted portion 42 may serve for piloting location of angularly spaced parts of the slinger plate 40'. The slinger plate 40' in such case need not require piloting lips, as at 44 in Fig. 13.

It will be appreciated that I have described relatively simple removable shield, seal, or slinger means for bearing assemblies. In every case, the removable parts may be made on a low-cost high-production basis. The assemblies may be assembled and reassembled without harm to the parts, and there need be no change in effectiveness with repeated disassembly. The removable parts may be adapted to standard production bearings, so that no special inner or outer bearings need be manufactured. Since the amount of axial preload is not critical, there may be wide tolerances on seal-groove widths and on other dimensions, without impairing assembly or shielding effectiveness; it will be noted, furthermore, that the wire or snap ring may retain the disc or cap in place even though there may be no axial or "anti-rattle" urging, as when there may have been errors in machining the groove. Since the shield or the slinger or the seal-retaining member does not have to be deformed, it may be made of metal or plastic or other suitable material. The self-piloting features of my constructions mean a minimum of shifting of parts in the presence of vibrations and, therefore, a minimum production of chips due to friction upon shifting of parts.

While I have described my invention in detail for the preferred forms shown, it will be understood that modifications may be made within the scope of the invention as defined in the appended claims.

I claim:

1. In a device of the character indicated, two relatively rotatable rings, one within the other and spaced apart radially and having generally cylindrical surfaces facing each other at one end, one of said rings having a rabbeted portion at said one end and defining a first radially extending abutment surface axially inwardly of said end, said ring at said one end having a radial circumferentially extending groove defined at one axial side by said first radially extending abutment surface and at the other axial side by a second radial abutment surface, which latter surface is determined by a cylindrical surface or land axially outwardly of said groove, a shield over said rabbeted portion and positioned in an axially inward direction by said first radially extending abutment surface, said shield having circumferential surfaces in engagement with said land to center said shield radially relatively to its ring, said shield adjacent said groove having circumferentially separated cutaway portions, a snap ring having generally radially extending projections to pass said cutaway portions and into said groove and having parts intermediate said projections fitting against said shield intermediate said cutaway portions, said snap ring being of resilient material, the axial separation between the axially outer limit of said projections and the axially inner limit of said intermediate parts of said snap-ring exceeding in the unstressed state the axial separation between said first and second radially extending abutment surfaces, less the thickness of the material of said shield, whereby upon assembly of said snap-ring in said groove said snap-ring will be axially stressed so as to constantly resiliently press said shield axially inwardly toward said first radially extending abutment surface and press axially against said second radial abutment surface.

2. In the combination defined in claim 1, said circumferential surfaces of said shield in engagement with said land comprising generally axially extending flanges on said shield.

3. In the combination defined in claim 1, said snap ring comprising a length of resilient wire of generally circular form, said projections thereon being offset radially and being of substantially the same curvature as the remainder of said ring.

4. In the combination defined in claim 1, said snap ring comprising a flat washer of circular form having a plurality of circumferentially spaced cutaway portions, the surfaces left by said cutaway portions being of substantially the same curvature as the remainder of said washer at the edge where said cutaway portions are located.

5. In a device of the character indicated, two relatively rotatable rings, one within the other and spaced apart radially and having generally cylindrical surfaces facing each other at one end, one of said rings having a rabbeted portion at said one end and defining a counterbore part terminating at a radially extending abutment surface axially inwardly of said end, said ring at said one end having a radial circumferentially extending groove axially outwardly of said abutment surface, said groove having at the axially outer limit thereof a radially extending abutment surface outwardly of said first abutment surface, a shield on said first-mentioned abutment surface, a snap-ring part holding said shield in place, said snap-ring part comprising a generally circular ring having circumferentially spaced surfaces in contact with said shield to hold the latter against said first-mentioned abutment, said snap-ring part having circumferentially spaced portions alternating with said surfaces in contact with said shield and extending into said groove beyond the edge of said shield, said snap-ring part being formed of resilient material, the axial separation between the axially outer limit of said circumferentially spaced portion and the axially inner limit of said surfaces in contact with said shield exceeding in the unstressed state the axial separation between said first-mentioned and second-mentioned radially extending abutment surfaces, less the thickness of the material of said shield, whereby upon assembly of said snap-ring in said groove said snap-ring will be axially stressed to resiliently press against said shield and simultaneously against said second-mentioned abutment, said shield and one of said parts having interengaging parts to center said shield relatively to its ring when said device is assembled.

References Cited in the file of this patent

UNITED STATES PATENTS

| | | |
|---|---|---|
| 1,150,080 | Tissue | Aug. 17, 1915 |
| 2,110,864 | Batesole | Mar. 15, 1938 |
| 2,188,596 | Hobert | Jan. 30, 1940 |
| 2,281,010 | Reynolds et al. | Apr. 28, 1942 |
| 2,379,053 | Weingart | June 26, 1945 |
| 2,395,359 | Vedovell | Feb. 19, 1946 |
| 2,419,885 | Cooper | Apr. 29, 1947 |
| 2,434,484 | Chambers, Jr. | Jan. 13, 1948 |